Figure 2:
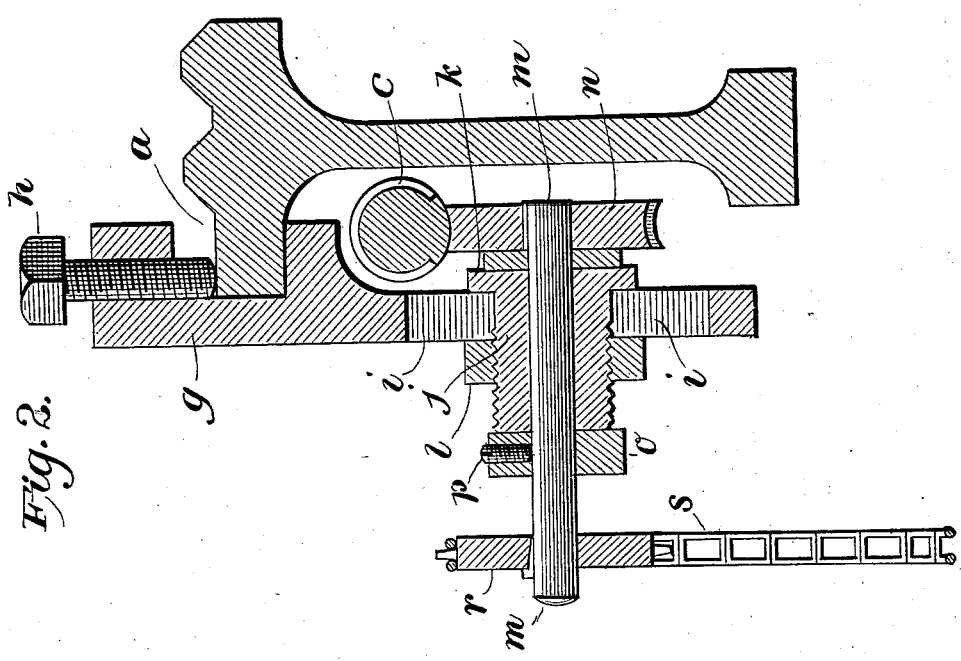

(No Model.) 2 Sheets—Sheet 1.

R. NORWELL.
LATHE ATTACHMENT FOR CUTTING SCREWS.

No. 477,777. Patented June 28, 1892.

WITNESSES:
J. F. Finch.
E. L. Smith

INVENTOR
Richard Norwell
BY
J. W. Smith Jr.
ATTORNEY (No Model.) 2 Sheets—Sheet 2.

R. NORWELL.
LATHE ATTACHMENT FOR CUTTING SCREWS.

No. 477,777. Patented June 28, 1892.

WITNESSES:
J. F. Kinch.
E. L. Smith.

INVENTOR
Richard Norwell
BY
J. W. Smith Jr.
ATTORNEY

UNITED STATES PATENT OFFICE.

RICHARD NORWELL, OF SOUTH NORWALK, CONNECTICUT.

LATHE ATTACHMENT FOR CUTTING SCREWS.

SPECIFICATION forming part of Letters Patent No. 477,777, dated June 28, 1892.

Application filed February 8, 1892. Serial No. 420,756. (No model.)

*To all whom it may concern:*

Be it known that I, RICHARD NORWELL, a subject of the Queen of Great Britain, residing at South Norwalk, in the county of Fairfield and State of Connecticut, have invented certain new and useful Improvements in Lathe Attachments for Cutting Screws; and I do hereby declare the following to be a full, clear, and exact description of the invention, such as will enable others skilled in the art to which it appertains to make and use the same.

My invention relates to certain new and useful improvements in lathe attachments for the purpose of predetermining the proper time at which the lead-nut of the carriage must be engaged with the lead-screw.

In operating a lathe it is in many kinds of work, and especially in cutting a screw, essential that the cutting-tool be caused to cut exactly in the same place on successive movements of the tool-carriage. A screw is cut in a lathe by a tool mounted on a traveling carriage, the latter being equipped with a lead-nut, which may be engaged with or disengaged from the lathe lead-screw at the will of the workman. The tool merely takes a thin chip during the travel of the carriage, it being necessary to disengage the latter from the lead-screw at the end of each forward movement and to run it back, so as to bring the tool into proper position to cut succeeding chips until the thread is completed. After the tool has taken an initial chip throughout the length of the screw and the carriage has been run back, so as to bring said tool into position to take a succeeding chip, the lead-nut must be thrown into engagement with the lead-screw in such manner that the tool will track within the groove caused by the preceding chip. If the number of threads to the inch to be cut is a multiple of the number of threads to the inch on the lead-screw, then my present invention is of no avail, because the tool will track uniformly no matter where the lead-nut is engaged with the lead-screw; but if the number of threads to the inch to be cut is not a multiple of the number of threads to the inch on the lead-screw then it becomes all important that the lead-nut and lead-screw be engaged at a predetermined time, so as to prevent the tool from being thrown against the face of the thread, and thereby mutilating or splitting the same; and it is the object of my invention to insure the engagement of said nut and screw at the proper time.

Heretofore it has been the custom to place chalk-marks on the lead-screw and on the lathe-spindle or on any part revolving concentrically with the latter, the location of said marks being such that whenever they arrive at certain points with relation to each other the lead-nut and lead-screw can then be readily engaged. This is, however, not only a very primitive way of determining the proper time for engaging said nut and screw, but it is also a very uncertain expedient, for the reason that the machinist is obliged to watch two independently-revolving elements, the result being that many screws are ruined and rendered unsightly.

My improvement comprises a simple device secured to the lathe-bed at any location, and will be best understood from the following description, reference being had to the accompanying drawings, forming a part of this specification, and in which—

Figure 1:
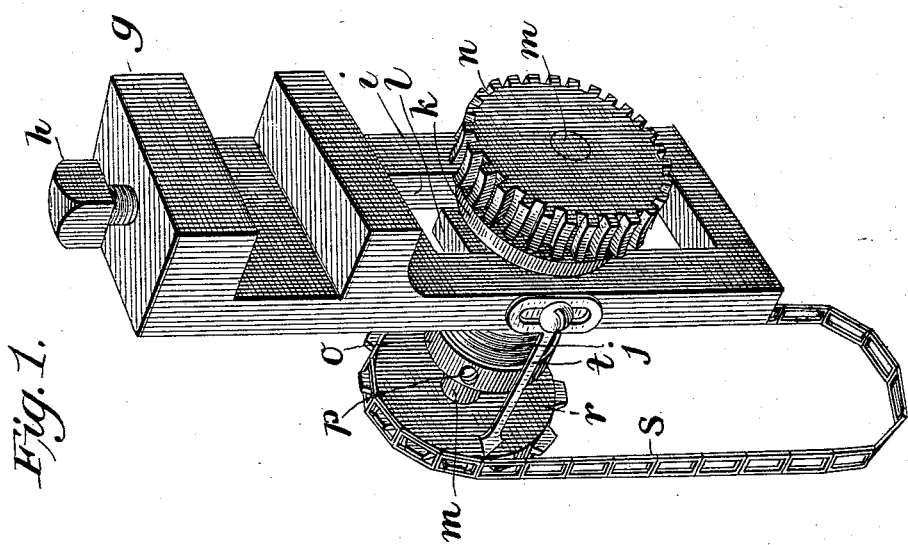
Figure 3:
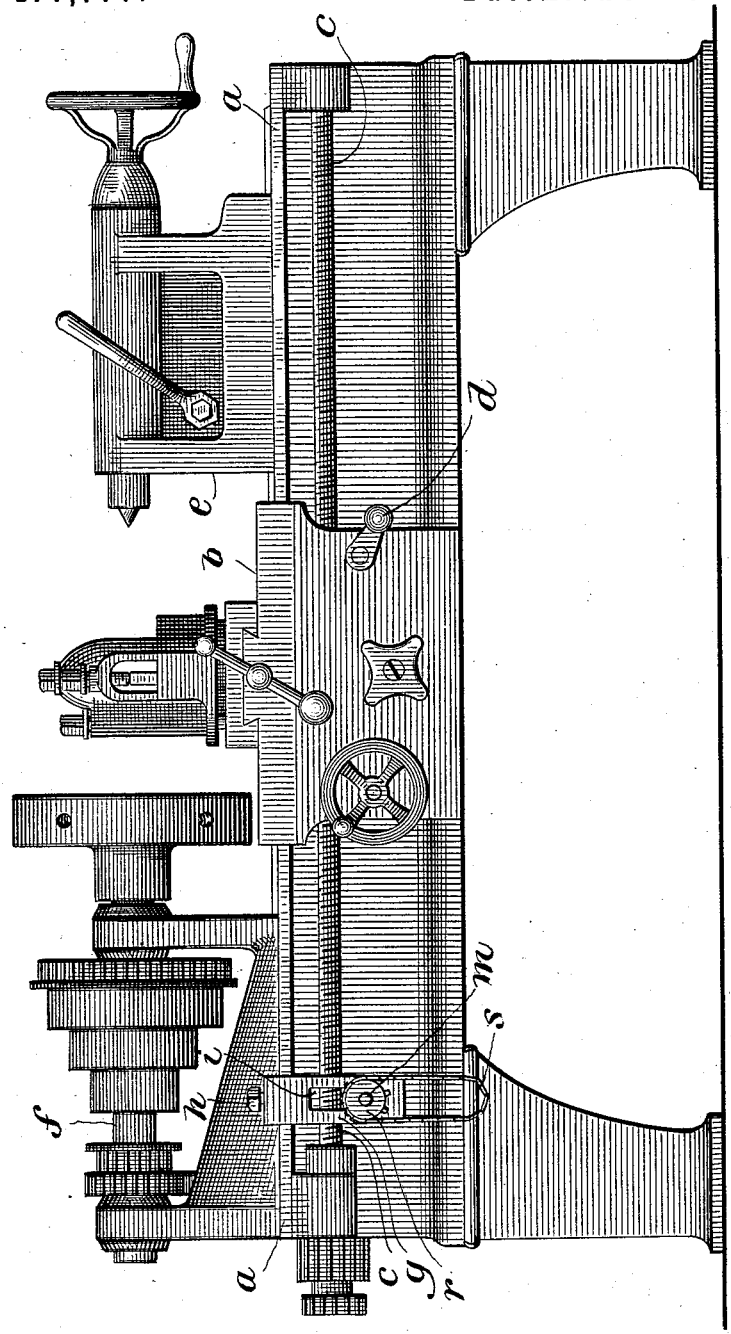

Figure 1 is a detail perspective of my improvement; Fig. 2, a sectional elevation of the same secured on a lathe-bed, and Fig. 3 a front elevation of a lathe equipped with my improvement.

Similar letters denote like parts in the several figures of the drawings.

$a$ is the lathe-bed, $b$ the tool-carriage, $c$ the lead-screw, $d$ the crank by which the lead-nut is operated, $e$ the tail-stock, and $f$ the lathe-spindle, all of ordinary construction and operation.

$g$ is a hanger, which is secured to the bed $a$ by a set-screw $h$. The lower part of this hanger has a gate $i$, within which a journal-box $j$ is secured. This box has a head $k$ at one end, while the other end is threaded to accommodate a nut $l$, a vertical adjustment of the box being effected by securing the same at any point throughout the gate. $m$ is a shaft journaled in said box and having mounted on its inner end a worm-wheel $n$, which meshes with the lead-screw $c$, whereby rotary motion is imparted to the shaft $m$.

$o$ is a collar around the shaft and set snugly against the outer end of the box $j$ by a screw $p$, whereby the shaft is confined as against inward lengthwise movement. This confining of the shaft is a very ordinary expedient and may be effected in many ways, all of which are within the scope of usual mechanical skill. On the outer end of this shaft is mounted a sprocket-wheel $r$, which carries a sprocket-chain $s$, which latter depends freely from said wheel.

$t$ is a pointer secured to the hanger and extending in close proxity to the chain.

In cutting a screw the carriage is always run back against a permanent stop, as the tail-piece, and the machinist simply ascertains what link is opposite to the pointer, when the lead-nut may be thrown into engagement with a lead-screw, and then he marks said link. As there may be several of such links throughout the length of the chain, they are all marked, so that when any one of them comes opposite to the pointer the machinist may know that the lead-nut may readily be thrown into engagement with the lead-screw. It makes no difference how many threads are to be cut to the inch, for the normal position of the carriage against the stop determines the location of the marking of the links, and such marking is not changed except when the normal position of the carriage is changed. One or more of the marked links is always in view, and it is a very simple matter to watch them as they approach the pointer.

Of course it will be readily understood that the pointer itself is not a necessary element in my improvement, since the links may be marked with reference to any object—as, for instance, the lead-screw—or the proper position of such marked links may be identified by the vertical or horizontal planes which intersect the axis of the shaft.

I claim—

1. In a device of the character described, the combination of the lead-screw, the shaft, the worm-wheel mounted on said shaft and meshing with said screw, the sprocket-wheel also mounted on said shaft, and the chain carried by the sprocket, substantially as set forth.

2. The combination of the rotatory shaft carrying the worm-wheel and sprocket-wheel with the lead-screw, with which said worm engages, and the chain carried by said sprocket, and means, as a stationary pointer, with which the links of said chain register, substantially as set forth.

3. In a lathe, the combination, with the lead-screw and the tool-carriage, which carries the lead-nut, of the hanger secured to the lathe-bed, the shaft journaled in said hanger and extending at right angles to the lead-screw, the worm mounted on said shaft and engaged with said screw, whereby rotation is imparted to the shaft, and a device carried by and revolving in harmony with said shaft and adapted to register at certain designated intervals with a stationary object, whereby the relative positions of said nut and screw proper for immediate engagement are predetermined, substantially as set forth.

In testimony whereof I affix my signature in presence of two witnesses.

RICHARD NORWELL.

Witnesses:
F. W. SMITH, Jr.,
S. S. WILLIAMSON.